US008544852B2

(12) United States Patent
Giri

(10) Patent No.: US 8,544,852 B2
(45) Date of Patent: Oct. 1, 2013

(54) TORSION SEAL

(75) Inventor: Sheo Narain Giri, Karnataka (IN)

(73) Assignee: General Electric Company, Schenectady, NY (US)

( * ) Notice: Subject to any disclaimer, the term of this patent is extended or adjusted under 35 U.S.C. 154(b) by 110 days.

(21) Appl. No.: 13/152,585

(22) Filed: Jun. 3, 2011

(65) Prior Publication Data
US 2012/0306167 A1    Dec. 6, 2012

(51) Int. Cl.
*F16J 15/02* (2006.01)

(52) U.S. Cl.
USPC .......................................... 277/644

(58) Field of Classification Search
USPC ................ 277/626, 644, 650; 415/134, 139; 267/154–156, 158, 160
See application file for complete search history.

(56) References Cited

U.S. PATENT DOCUMENTS

| | | | |
|---|---|---|---|
| 1,901,994 A | 3/1933 | Soss | |
| 2,151,240 A | 3/1939 | Soss | |
| 2,368,702 A | 2/1945 | Bourne | |
| 3,075,234 A | 1/1963 | Speakman | |
| 3,169,749 A | 2/1965 | Harris | |
| 3,358,440 A * | 12/1967 | Freid | 60/791 |
| 4,030,288 A * | 6/1977 | Davis et al. | 60/791 |
| 4,537,024 A * | 8/1985 | Grosjean | 60/791 |
| 4,617,857 A | 10/1986 | Kedzierski | |
| 4,626,002 A | 12/1986 | Hagemeister et al. | |
| 4,637,588 A | 1/1987 | Wilhelm et al. | |
| 4,709,121 A | 11/1987 | Shores | |
| 4,787,642 A | 11/1988 | Etheridge | |
| 4,796,330 A | 1/1989 | Ziegler | |
| 4,813,608 A | 3/1989 | Holowach et al. | |
| 4,813,692 A | 3/1989 | Halling et al. | |
| 5,470,198 A | 11/1995 | Harrogate et al. | |
| 5,865,600 A | 2/1999 | Mori et al. | |
| 5,961,244 A | 10/1999 | Hahn | |
| 6,193,240 B1 | 2/2001 | Johnson et al. | |
| 6,199,871 B1 * | 3/2001 | Lampes | 277/614 |
| 6,276,026 B1 | 8/2001 | Wille | |
| 6,325,392 B1 * | 12/2001 | Halling | 277/654 |
| 6,332,617 B1 | 12/2001 | Leveaux et al. | |
| 6,431,825 B1 | 8/2002 | McLean | |
| 6,450,762 B1 | 9/2002 | Munshi | |
| 6,547,257 B2 | 4/2003 | Cromer | |
| 6,626,440 B2 * | 9/2003 | Halling | 277/626 |
| 6,721,992 B2 | 4/2004 | Cotton | |

(Continued)

FOREIGN PATENT DOCUMENTS

| | | |
|---|---|---|
| EP | 0503983 A1 | 9/1992 |
| EP | 1130219 A1 | 9/2001 |
| WO | 0227148 A1 | 4/2002 |

OTHER PUBLICATIONS

Office Action dated Nov. 21, 2012 for U.S. Appl. No. 13/152,619.

(Continued)

*Primary Examiner* — Vishal Patel
*Assistant Examiner* — Stacy Warren
(74) *Attorney, Agent, or Firm* — Cantor Colburn LLP

(57) ABSTRACT

A torsion seal is provided and includes a first section, a second section and a torsion section connected at opposite end portions thereof to the first and second sections and having a central portion extending between the opposite end portions to absorb differential thermal growth of vessels to which the first and second sections are coupled.

18 Claims, 2 Drawing Sheets

(56) References Cited

U.S. PATENT DOCUMENTS

| | | |
|---|---|---|
| 6,883,807 B2 | 4/2005 | Smed |
| 6,971,844 B2 * | 12/2005 | Burdgick ............... 415/139 |
| 7,004,478 B2 | 2/2006 | Spence et al. |
| 7,238,003 B2 | 7/2007 | Synnott et al. |
| 7,316,402 B2 | 1/2008 | Paauwe |
| 7,360,769 B2 | 4/2008 | Bennett |
| 7,481,037 B2 | 1/2009 | Takaya et al. |
| 7,527,469 B2 | 5/2009 | Zborovsky et al. |
| 7,575,195 B2 | 8/2009 | Eveker et al. |
| 7,694,915 B2 | 4/2010 | Mindermann et al. |
| 7,736,122 B1 | 6/2010 | Stone |
| 7,744,096 B2 | 6/2010 | Kono |
| 7,748,531 B2 | 7/2010 | O'Hara |
| 7,887,286 B2 | 2/2011 | Abgrall et al. |
| 7,901,186 B2 | 3/2011 | Cornett et al. |
| 8,108,980 B2 | 2/2012 | Eveker et al. |
| 2004/0239053 A1 | 12/2004 | Rowe et al. |
| 2005/0063816 A1 | 3/2005 | Jorgensen |
| 2006/0082074 A1 | 4/2006 | Synnott et al. |
| 2008/0053107 A1 | 3/2008 | Weaver et al. |
| 2009/0072497 A1 | 3/2009 | Kunitake et al. |
| 2009/0140497 A1 | 6/2009 | Roberts et al. |
| 2010/0044613 A1 | 2/2010 | Gossett et al. |
| 2010/0061837 A1 | 3/2010 | Zborovsky et al. |
| 2011/0079944 A1 | 4/2011 | Akasaka et al. |
| 2012/0306168 A1 | 12/2012 | Giri |
| 2012/0306169 A1 | 12/2012 | Giri |

OTHER PUBLICATIONS

Search Report and Written Opinion from EP Application No. 12169887.2 dated Sep. 20, 2012.

Search Report and Written Opinion from EP Application No. 12169888.0 dated Feb. 4, 2013.

Office Action dated Apr. 1, 2013 for U.S. Appl. No. 13/152,604 (26 pages).

* cited by examiner

TORSION SEAL

CROSS REFERENCE TO RELATED APPLICATIONS

This application is related to the application entitled "Formed Flexible Seal," and the application entitled "Hinge Seal," which are being filed concurrently herewith on Jun. 3, 2011 by the inventor of the present application and incorporated herein in their entirety.

BACKGROUND OF THE INVENTION

The subject matter disclosed herein relates to a torsion seal.

In gas turbine engines, combustion of fuel and compressed air occurs in a combustor. High temperature and high energy fluids produced by that combustion are directed to flow from the combustor into a transition piece and toward a turbine section. The transition piece and the turbine section are normally coupled to one another at an aft frame of the transition piece and the stage 1 nozzle. This coupling can be achieved by advanced cloth seals.

During turbine operations and transient cycles in particular, the transition piece and the stage 1 nozzle may experience differential axial and radial deformation that affects several components including the seals between the transition piece and the stage 1 nozzle. In fact, field experience has revealed that the stage 1 nozzle tends to creep and due to nozzle creep deflection, seal effectiveness decreases. This decreased seal effectiveness in turn results in cooling air leakage to the primary flow path causing performance loss.

BRIEF DESCRIPTION OF THE INVENTION

According to one aspect of the invention, a torsion seal is provided and includes a first section, a second section and a torsion section connected at opposite end portions thereof to the first and second sections and having a central portion extending between the opposite end portions to absorb differential thermal growth of vessels to which the first and second sections are coupled.

According to another aspect of the invention, a torsion seal is provided and includes a first section coupled to a first vessel, a second section coupled to a second vessel and a torsion section connected at opposite end portions thereof to the first and second sections and having a coiled portion extending between the opposite end portions to absorb at least one of radial, circumferential and axial differential thermal growth of the first and second vessels.

According to yet another aspect of the invention, a torsion seal is provided and includes a first section coupled to a first vessel, a second section coupled to a second vessel and a torsion section connected at opposite end portions thereof to the first and second sections and having a coiled portion extending between the opposite end portions, the coiled portion being configured to uncoil to responsively absorb forces applied to the first and second sections by the first and second vessels in accordance with differential thermal growth of the first and second vessels.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

In accordance with aspects, a coil or torsion seal provides cost effective and rugged design to improve sealing effectiveness in at least the transient environment. The torsion seal shows prompt thermal response and, due to temperature changes, the torsion seal twists and untwists to provide ample room for deformation with fixed or substantially fixed transition piece and stage 1 nozzle end constraints. As will be discussed below, the torsion seal can be assembled with the transition piece and stage 1 nozzle using screw/bolt fasteners to ensure metal to metal contact or other similar arrangements.

Figure 1:
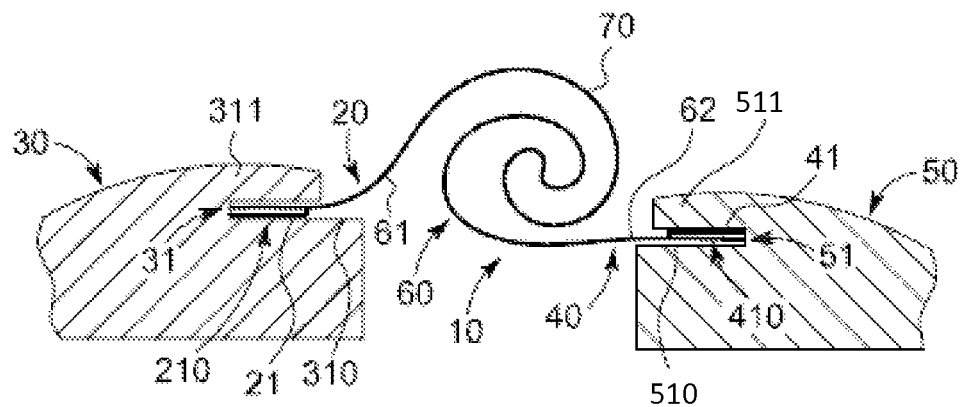
FIG. 1 is a side view of a torsion seal in accordance with embodiments.
Figure 2:
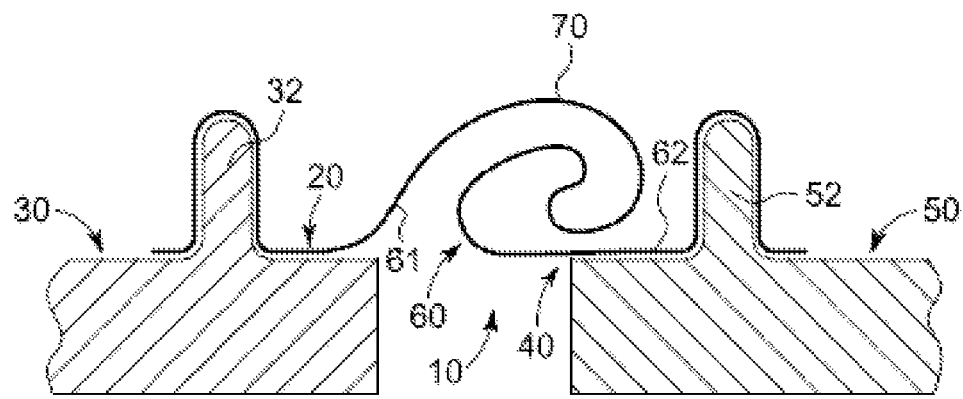
FIG. 2 is a side view of a torsion seal in accordance with alternative embodiments.
Figure 3:
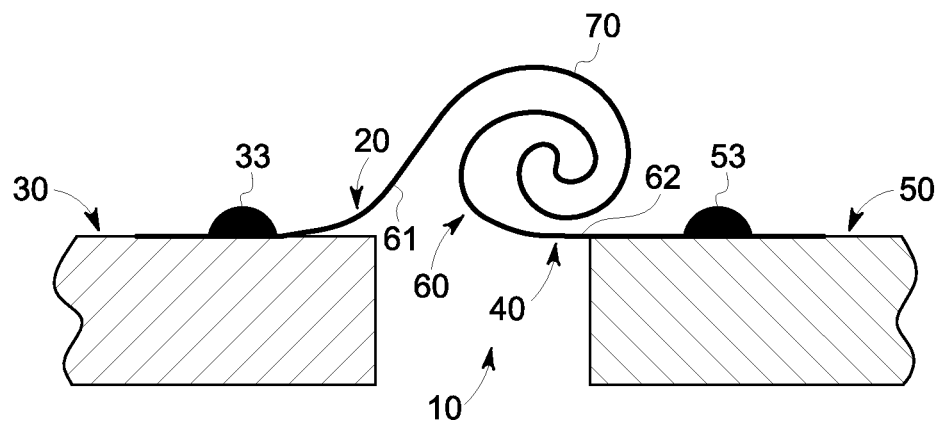
FIG. 3 is a side view of a torsion seal in accordance with alternative embodiments.

With reference to FIGS. 1-3, a torsion seal 10 is provided. The seal 10 includes a first section 20, which is coupled to a first vessel 30 of, for example, a gas turbine engine, a second section 40, which is coupled to a second vessel 50 of the exemplary gas turbine engine, which is disposed downstream from the first vessel 30, and a torsion section 60. In accordance with embodiments, the first vessel 30 may include a transition piece of the exemplary gas turbine engine and the second vessel 50 may include a stage 1 nozzle with the first section 20 coupled to an aft frame of the transition piece and the second section 40 coupled to a side wall of the stage 1 nozzle. However, it is to be understood that the seal 10 can be applied to any components of the exemplary gas turbine engine or another similar apparatus.

The torsion section 60 has opposite end portions 61 and 62 and is connected at the opposite end portions 61 and 62 to the first and second sections 20 and 40, respectively. The torsion section 60 further includes a central, coiled portion 70 extending between the opposite end portions 61 and 62. The coiled portion 70 uncoils to responsively absorb torsion forces applied to the first and second sections 20 and 40 by the first and second vessels 30 and 50 in accordance with at least one or more of radial, circumferential and axial differential thermal growth of the first and second vessels 30 and 50.

That is, as temperatures within the exemplary gas turbine engine increase and the first and second vessels 30 and 50 experience, for example, thermal expansion, one or both of the first and second vessels 30 and 50 may translate relative to the other. This relative translation causes one or both of the first and second vessels 30 and 50 to pull on the first and second sections 20 and 40. This pulling is absorbed by the torsion section 60 whereby the coiled portion 70 uncoils and flattens. As such, an effective overall length of the seal 10 is increased such that the relative translation can be absorbed.

As shown in FIG. 1, the first section 20 may be coupled to the first vessel 30 by an end 21 thereof being bent into a preloaded U-shape 210 and inserted into a preloaded groove 31 of the first vessel 30. This preloaded groove 31 may include a shoulder portion 310 and a flap 311, which radially opposes the shoulder portion 310, and can be formed by machining or another similar process. In a similar manner, the second section 40 may be coupled to the second vessel 50 by an end 41 thereof being bent into a preloaded U-shape 410 and inserted into a preloaded groove 51 of the second vessel 50. This preloaded groove 51 may include a shoulder portion 510 and a flap 511, which radially opposes the shoulder portion 510, and can be formed by machining or another similar process. In particular, the configuration of FIG. 1 can serve to prevent seal crushing in event of transition piece aft frame and stage 1 nozzle penetration during transient cycles.

As shown in FIG. 2, the first section 20 may be coupled to the first vessel 30 by being preloaded and circumferentially mated with a flange 32 of the first vessel 30. In a similar manner, the second section 40 may be coupled to the second vessel 50 by being preloaded and circumferentially mated with a flange 52 of the second vessel 50.

As shown in FIG. 3, the first section 20 may be coupled to the first vessel 30 by being at least one of welded and screwed or otherwise attached to the first vessel 30 at a weld point 33 or attachment point. In a similar manner, the second section 40 may be coupled to the second vessel 50 by being at least one of welded and screwed or otherwise attached to the second vessel 50 at a weld point 53 or attachment point.

Figure 4:
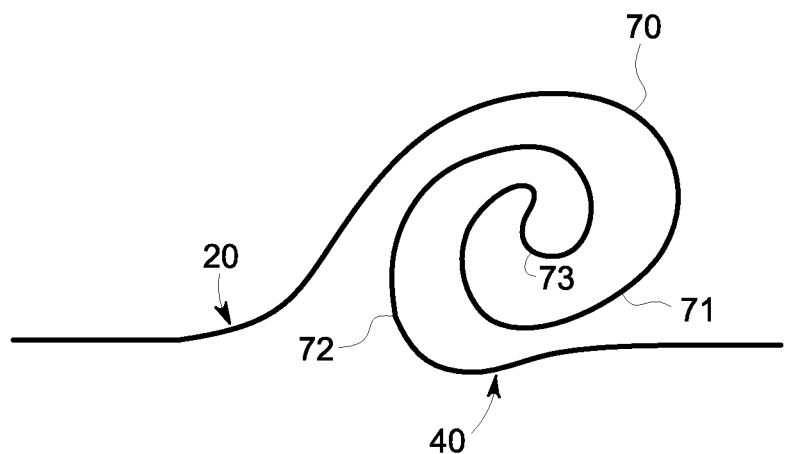
FIG. 4 is an enlarged view of the torsion seal of FIGS. 1, 2 and 3.

With reference to FIG. 4, the first and second sections 20 and 40 have substantially similar lengths and, at least at an initial time prior to any at least one of radial, axial and circumferential differential thermal growth of the first and second vessels 30 and 50, the first and second sections 20 and 40 are oriented substantially in parallel with one another. In some cases, the first and second sections 20 and 40 may be coplanar and/or coaxial. By contrast, the coiled portion 70 protrudes radially outwardly from respective planes of the first and second sections 20 and 40. In accordance with alternative embodiments, the coiled portion 70 may also protrude radially inwardly from the respective planes of the first and second sections 20 and 40. In accordance with still further alternative embodiments, the coiled portion 70 may also protrude radially inwardly and radially outwardly from the respective planes of the first and second sections 20 and 40. In any case, the coiled portion 70 has a height as measured from the respective planes of the first and second sections 20 and 40 that is substantially larger than a thickness of the first section 20, the second section 40 or the torsion section 60.

As shown in FIG. 4, the coiled portion 70 may include an inwardly spiraling portion 71 and an outwardly spiraling portion 72. The inwardly spiraling portion 71 and the outwardly spiraling portion 72 are interchangeable depending on observational perspective. The inwardly spiraling portion 71 and the outwardly spiraling portion 72 may be substantially parallel along respective lengths thereof or at least along portions of respective lengths thereof and they may cooperatively form one or more loops. The coiled portion 70 further includes a hairpin portion 73 at which the inwardly spiraling portion 71 and the outwardly spiraling portion 72 meet.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A torsion seal, comprising:
a first section;
a second section; and
a torsion section connected at opposite end portions thereof to the first and second sections and having a central portion extending between the opposite end portions to absorb differential thermal growth of vessels to which the first and second sections are coupled,
wherein the central portion comprises a coiled portion including:
an inwardly spiraling portion that extends radially outwardly from the first section and then spirals inwardly toward a point mid-way between the first and second sections, and
an outwardly spiraling portion that spirals outwardly from the point and then extends substantially axially toward the second section wherein the inwardly spiraling portion and the outwardly spiraling portion are overlapping.

2. The torsion seal according to claim 1, wherein the vessels each comprise a component of a gas turbine engine.

3. A torsion seal, comprising:
a first section coupled to a first vessel;
a second section coupled to a second vessel; and
a torsion section connected at opposite end portions thereof to the first and second sections and having a coiled portion extending between the opposite end portions to absorb at least one of radial, circumferential and axial differential thermal growth of the first and second vessels,
wherein the coiled portion includes:
an inwardly spiraling portion that extends radially outwardly from the first section and then spirals inwardly toward a point mid-way between the first and second sections, and
an outwardly spiraling portion that spirals outwardly from the point and then extends substantially axially toward the second section wherein the inwardly spiraling portion and the outwardly spiraling portion are overlapping.

4. The torsion seal according to claim 3, wherein the first and second vessels each comprise a component of a gas turbine engine.

5. The torsion seal according to claim 3, wherein the first section is preloaded and coupled to a preloaded groove of the first vessel.

6. The torsion seal according to claim 3, wherein the first section is preloaded and coupled to a flange of the first vessel.

7. The torsion seal according to claim 3, wherein the first section is at least one of welded and screwed to the first vessel.

8. The torsion seal according to claim 3, wherein the second section is preloaded and coupled to a preloaded groove of the second vessel.

9. The torsion seal according to claim 3, wherein the second section is preloaded and coupled to a flange of the second vessel.

10. The torsion seal according to claim 3, wherein the second section is at least one of welded and screwed to the second vessel.

11. The torsion seal according to claim 3, wherein the first and second sections have substantially similar lengths.

12. The torsion seal according to claim 3, wherein the coiled portion protrudes radially outwardly from respective planes of the first and second sections.

13. The torsion seal according to claim 3, wherein the inwardly and outwardly spiraling portions are substantially parallel along respective lengths thereof.

14. The torsion seal according to claim 3, wherein a height of the coiled portion is substantially larger than a thickness of the first, second and torsion sections.

15. The torsion seal according to claim 3, wherein the coiled portion comprises one or more loops.

16. A torsion seal, comprising:
a first section coupled to a first vessel;
a second section coupled to a second vessel; and
a torsion section connected at opposite end portions thereof to the first and second sections and having a coiled portion extending between the opposite end portions,
the coiled portion being configured to uncoil to responsively absorb forces applied to the first and second sections by the first and second vessels in accordance with differential thermal growth of the first and second vessels,
wherein the coiled portion includes:
an inwardly spiraling portion that extends radially outwardly from the first section and then spirals inwardly toward a point mid-way between the first and second sections, and
an outwardly spiraling portion that spirals outwardly from the point and then extends substantially axially toward the second section wherein the inwardly spiraling portion and the outwardly spiraling portion are overlapping.

17. The torsion seal according to claim 16, wherein the first and second vessels each comprise a component of a gas turbine engine.

18. The torsion seal according to claim 16, wherein the coiled portion protrudes radially outwardly from respective planes of the first and second sections.

* * * * *